United States Patent
Parmentier et al.

(10) Patent No.: US 6,361,900 B1
(45) Date of Patent: Mar. 26, 2002

(54) CARBON FIBER ELECTRODE FOR A SECONDARY CELL

(75) Inventors: Philippe Parmentier, Villeurbanne; Francois Beguin, Orleans, both of (FR); Elzbieta Frackowiak, Poznan (PL)

(73) Assignee: Messier-Bugatti, Velizy-Villacoublay (FR)

( * ) Notice: Subject to any disclaimer, the term of this patent is extended or adjusted under 35 U.S.C. 154(b) by 0 days.

(21) Appl. No.: 09/555,499

(22) PCT Filed: Dec. 1, 1998

(86) PCT No.: PCT/FR98/02580

§ 371 Date: Jun. 1, 2000

§ 102(e) Date: Jun. 1, 2000

(87) PCT Pub. No.: WO99/28983

PCT Pub. Date: Jun. 10, 1999

(30) Foreign Application Priority Data

Dec. 2, 1997 (FR) .............................. 97 15142

(51) Int. Cl.⁷ ................................ H01M 4/58
(52) U.S. Cl. ................ 429/231.8; 429/218.1; 429/233; 429/235; 429/231.95
(58) Field of Search .................. 429/231.8, 218.1, 429/233, 235, 231.95

(56) References Cited

U.S. PATENT DOCUMENTS

| | | | |
|---|---|---|---|
| 4,861,690 A | 8/1989 | Hope et al. | 429/233 |
| 5,348,818 A * | 9/1994 | Asami et al. | 429/213 |
| 5,518,836 A | 5/1996 | McCullough | 429/94 |
| 5,587,255 A * | 12/1996 | Sonobe et al. | 429/231.8 |
| 5,624,606 A * | 4/1997 | Wilson et al. | 429/231.8 |

FOREIGN PATENT DOCUMENTS

| | | |
|---|---|---|
| EP | 0 460 617 | 12/1991 |
| EP | 0 767 505 | 4/1997 |
| JP | 62 154461 | 7/1987 |

* cited by examiner

*Primary Examiner*—Laura Weiner
(74) *Attorney, Agent, or Firm*—Weingarten, Schurgin, Gagnebin & Lebovici LLP

(57) ABSTRACT

The carbon fibers present a mean lattice surface spacing ($d_{002}$) not less than 0.36 nm, preferably 0.38 nm, at a crystallite size such that the mean height ($L_c$) lies in the range 0.7 nm to 0.3 nm and the mean width ($L_a$) lies in the range 2 nm to 6 nm, and it presents total porosity lying in the range 10% to 30%. The electrode is preferably a rayon-precursor carbon cloth and it constitutes the anode (10) of a secondary cell having a cathode (20) which includes lithium enabling lithium ions to be inserted and de-inserted, and an electrolyte (30).

25 Claims, 3 Drawing Sheets

CARBON FIBER ELECTRODE FOR A SECONDARY CELL

FIELD OF THE INVENTION

The invention relates to secondary cells, in particular rechargeable lithium batteries, and it relates more particularly to making carbon fiber electrodes for such cells.

BACKGROUND OF THE INVENTION

In lithium secondary cells, it is known that a carbon-based material can be used as the anode into which lithium ions can become inserted during charging and from which they are de-inserted while discharging.

Usually, the carbon-containing material is presented in the form of a carbon or graphite powder bonded with a binder and deposited on an electrically conductive substrate such as a sheet of copper or other conductive metal. Document EP 0 765 505-A1 illustrates the state of the art, for example.

A drawback of that known technique lies in the use of solvents for mixing the carbon-containing powder with a binder, which solvents need to be recovered and regenerated. In addition, the binders in common use deteriorate at temperatures that are relatively low, typically above 50° C., running the risk of spoiling the electrode. Furthermore, options for shaping the complex constituted by the metal substrate covered in one or two layers of bonded-together carbon-containing particles in a binder without damage are restricted, thereby limiting the electrode shapes that can be made.

Proposals have also been made to use a carbon-containing material in the form of carbon fibers, in particular in the form of a woven or non-woven fabric of carbon fibers. Reference can be made to document EP-A-0 629 011 which describes an electrode made up of a sheet of uni-direction fibers secured by adhesive on a foil of electrically conducive material. Constraints on shaping exists as in the preceding case.

There is also a problem that exists with using a carbon-containing material in the form of graphite: this is the risk of exfoliation, i.e. the carbon-structure becoming partially destroyed after successive charge and discharge cycles.

An object of the invention is to provide a carbon fiber electrode making it possible to eliminate or at least greatly attenuate that risk. Another object of the invention is to provide a carbon fiber electrode is easy to shape. The invention also has the object of providing a carbon fiber electrode having improved insertion and de-insertion capacity for lithium ions when used in lithium secondary cells. In this particular application, another object of the invention is to provide a carbon fiber electrode in a form that makes it possible to introduce agents for doping lithium-affinity in electron and/or steric hindrance terms.

BRIEF SUMMARY OF THE INVENTION

In one aspect, the invention provides a secondary cell electrode comprising a carbon fiber substrate in which the carbon of the fibers has a mean lattice surface spacing ($d_{002}$) of not less than 0.36 nanometers (nm), and a crystallite size such that the mean height ($L_c$) lies in the range 0.7 nm to 3 nm and the mean width ($L_a$) lies in the range 2 nm to 6 nm, and presents total porosity lying in the range 10% to 30%.

The lattice surface spacing ($d_{002}$) is a measure of the distance between two consecutive graphene sheets within the structure of the carbon, as obtained by scattering X-rays on the substrate. The dimensions $L_c$ and $L_a$ are measured in the same manner, as described in detail below.

Preferably, the mean lattice surface spacing ($d_{002}$) is not less than 0.38 nm, while the size of the crystallites is such that the mean height ($L_c$) is equal to about 1 nm and the mean width ($L_a$) is equal to about 3 nm, and the total porosity of the carbon fibers is equal to about 20%.

Thus, a characteristic of the invention lies in the use of carbon fibers in which the lattice surface spacing ($d_{002}$) is greater than that of graphite (typically 0.3354 nm). The risk of exfoliation by repeated insertions and de-insertions of lithium ions between the sheets of the carbon structure is thus greatly reduced, or even eliminated. In addition, the small dimensions of the crystallites and the porosity thereof provide spaces for receiving lithium ions.

The carbon fibers come from a precursor that gives rise to carbon that is "hard", i.e. non-graphitizable, such as a precursor selected from cellulose precursors, phenolic precursors, and isotropic pitch precursors. Such a "hard" carbon presents a structure and a microtexture that are much less organized than that of graphite, which also favors lithium ion insertion and de-insertion, and which makes it possible to obtain lithium batteries of high capacity.

The carbon fibers are preferably derived from a cellulose precursor, such as a rayon or a rayon staple in which carbon black may have been incorporated.

Also preferably, the carbon fiber substrate is a two-dimensional fabric, in particular a woven cloth, having a cellulose precursor and in particular a rayon precursor, and which is not bonded to a conductive metal support. This avoids the problems that result when using binders that can be damaged by being heated, and possible shaping of the electrode, e.g. by being rolled up, is facilitated.

In another aspect, the invention provides a method of manufacturing an electrode for a secondary cell, the method comprising the steps which consist in:

preparing a two-dimensional fabric of carbon-precursor fibers selected from cellulose precursors, phenolic precursors, and isotropic pitch precursors; and performing heat treatment to transform the precursor into carbon, in which the lattice surface spacing ($d_{002}$) is not less than 0.36 nm, preferably not less than 0.38 nm, the crystallite size is such that the mean height ($L_c$) lies in the range 0.7 nm to 3 nm, preferably equal to about 1 nm, and the mean width ($L_a$) lies in the range 2 nm to 6 nm, preferably equal to about 2 nm, and the total porosity of the carbon fibers lies in the range 10% to 30%, preferably equal to about 20%.

The heat treatment for transforming the precursor into carbon is performed at a temperature that preferably lies in the range 700° C. to 1300° C., i.e. well below that required for graphitization, which is typically 2800° C. When using a rayon precursor, the heat treatment temperature advantageously lies in the range 900° C. to 1000° C., and the time spent at that temperature preferably lies in the range 0.1 minutes (min) to 1.5 min.

By a suitable choice of carbon precursor and of heat treatment, it is possible to provide a carbon that has sheets containing a large number of defects of the sp3 hybridization type and having crystallites of very small size. This gives rise firstly to a smaller risk of exfoliation because the carbon structure has a certain amount of "elasticity", and secondly to great capacity for insertion and de-insertion of lithium ions in particular because of the larger number of pores contained within the texture of the fiber.

The carbon fiber fabric can be obtained using a two-dimensional fabric such as a woven cloth, a felt, a knit, a uni-directional sheet, or a plurality of uni-directional sheets that are superposed.

According to another aspect of the invention, in a secondary cell having an anode and a cathode enabling lithium ions to be inserted and de-inserted, and also having an electrolyte, the anode is constituted by a carbon fiber substrate made as described above.

DESCRIPTION OF PREFERRED EMBODIMENTS OF THE INVENTION

Figure 1:
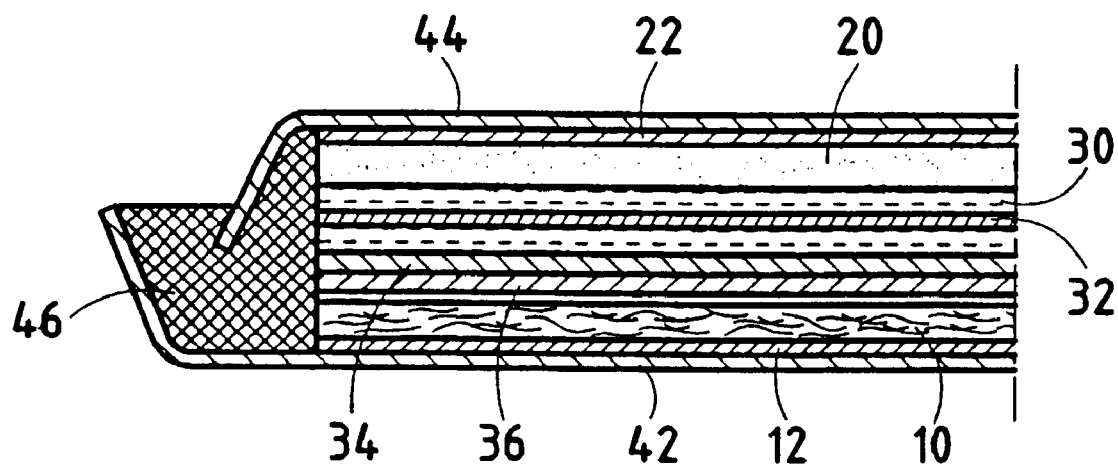
FIG. 1 is a highly diagrammatic fragmentary section view showing the structure of a secondary cell.

FIG. 1 shows a portion of a lithium secondary cell in the form of a disk or "button" that comprises an anode (negative electrode) 10 made of a carbon substrate, a cathode (positive electrode) 20, a separator formed by one or more sheets in the form of disks 32, 34, and 36 immersed in an electrolyte 30 between the anode and the cathode. The faces of the anode 10 and of the cathode 20 remote from their faces in contact with the electrolyte are in electrical contact with respective metal collector disks 12 and 22. The assembly is encapsulated in a housing having two plates 42 and 44 pressed respectively against the disks 12 and 22 and mechanically interconnected at their periphery via an insulating gasket 46. The plates 42 and 44 constitute the negative and positive terminals respectively of the cell. Encapsulation is performed under sufficient pressure to ensure that the required electrical contact is established between the anode 10, the collector 12, and the plate 42, and also between the cathode 20, the collector 22, and the plate 44. Such a structure for a secondary cell is well known.

Also in conventional manner, the cathode 20 typically uses as its active material a lithium-containing oxide of a transition metal, e.g. $LiCoO_2$, $LiMnO_2$, $LiNiO_2$, $LiMn_2O_4$, or a conjugate polymer such as polyacetylene, polyparaphenylene, polythiophene, polypyrrol, or polyaniline. The active material is in the form of a powder mixed with a conductive powder and a binder so as to form the cathode 20. The conductive powder can be carbon black or graphite. By way of example, the binder is polyethylene, or polypropylene, or an elastomer.

The electrolyte 30 can comprise a lithium salt dissolved in one or more organic solvents. It is also possible to use a solid electrolyte such as a polymer.

Various materials suitable for forming the cathode and the electrolyte 30 are known. Reference can be made in particular to documents EP-A-0 249 331, EP-A-0 563 911, EP-A-0 629 011 (already mentioned), and WO-A-97/28570.

If the electrolyte is not solid, the separator has the specific function of preventing a short circuit between the anode and the cathode. It is constituted by one or more woven or non-woven sheets, e.g. made of polypropylene or of polyethylene. In the example shown, a thin sheet 32 of polypropylene seeks to prevent metallic lithium dendrites forming on the cathode since they could give rise to short circuits, while the sheets 34 and 36 are made of thicker sheets of polypropylene disposed between the sheet 32 and the anode 10, and seeking to provide good wetting of the electrodes by the electrolyte by coming into contact therewith.

The present invention relates more particularly to how the anode 10 is made. This is formed by a carbon fiber substrate with a mean lattice surface spacing ($d_{002}$) between the planes of the carbon structure of at least 0.36 nm. This mean lattice surface spacing lies in the range 0.36 nm to 0.39 nm, and is preferably not less than 0.38 nm. The height ($L_c$) of the crystallites is on average 0.7 nm to 3 nm, and preferably about 1 nm, and he width thereof ($L_a$) is on average 2 nm to 6 nm, and preferably about 3 nm. The total porosity of the carbon fibers lies in the range 10% to 30%, and is preferably equal to about 20%.

The lattice surface spacing ($d_{002}$) is measured by applying Bragg's law to the 002 spectrum line of carbon. The X-ray source emits in a direction perpendicular to the carbon fibers to be evaluated, with the carbon fibers revolving about an axis coinciding with the direction of the emitted X-rays so as to obtain mean spectra that are independent of the orientation of the micromolecules of the material. The half-height widths of the 002 and the hK peaks obtained on the mean spectrum lead respectively to measurements for the height ($L_c$) and the width ($L_a$) of the crystallites by using Scherrer's formula. The values of $L_c$ and $L_a$ mentioned in the present application are thus mean values.

The total porosity of the carbon fibers represents the percentage of the volume occupied by the pores compared with the apparent volume of the fibers. It can be measured by the known technique of small angle X-ray scattering (the SAXS method). To this end, the fibers are exposed to a beam of X-rays under conditions such that electron density contrast exists between the voids (pores) and the material (carbon), and thus scattering intensity exists that is related to the total pore content of the carbon fibers.

The carbon fiber substrate is formed from a two-dimensional fabric of carbon-precursor fibers. The term "two-dimensional fabric" is used to cover a woven cloth, a thin felt, a knit, a uni-directional sheet, or a plurality of superposed uni-directional sheets, optionally extending in different directions and connected together, e.g. by light needling. The carbon precursor fibers are formed by filaments that are continuous or discontinuous.

To form a carbon fiber substrate, a plurality of two-dimensional fabric layers can be superposed. The superposed layers are advantageously bonded together, e.g. by needling. Under such circumstances, the needling is preferably performed at the precursor stage, i.e. before heat treatment for transforming the precursor into carbon.

The carbon precursor used is selected from those which, on heat treatment, give rise to carbon that is "hard", i.e. non-graphitizable, having the required lattice surface spacing ($d_{002}$), crystallite size, and total porosity.

Suitable industrial precursors for this are cellulose precursors, phenolic precursors, and isotropic pitch precursors. The heat treatment for transforming the precursor is performed at a maximum temperature lying in the range 700° C. to 1300° C. for a length of time that is relatively short, preferably less than 1 minute to a few minutes. This heat treatment is thus much easier to implement than that which would be required for performing graphitization since that requires a temperature that is typically about 2800° C.

It is preferable to use a cellulose precursor such as rayon or rayon staple. When using rayon, the heat treatment is performed at a temperature lying in the range 900° C. to 1000° C., and this temperature is maintained for a length of time lying in the range 0.1 min to 1.5 min. It can be preceded by a precarbonization stage at a temperature lying in the range 350° C. to 420° C.

Also preferably, a cellulose precursor is used such as rayon, in which carbon black has been incorporated. As a result, the electrical resistance of the carbon fiber fabric is sufficiently low to make it unnecessary for the fabric to be bonded to an electrically conductive support such as a metal foil in order to perform its function as an electrode. In addition to the advantage of not requiring the use of a binder, this also makes it such easier to shape the electrode as a function of its intended use.

Advantageously, prior to heat treatment for transformation into carbon, the two-dimensional fabric of carbon-precursor fibers has an agent incorporated therein for the purpose of subsequently facilitating insertion and de-insertion of lithium ions, by giving rise to disorganization of the structure and/or the microtexture of the carbon, and/or by increasing its affinity for lithium ions.

Such an agent is selected from inorganic or organic compounds that include a function that affects the structure and/or the microtexture of the carbon, in terms of electrons or steric hindrance, so as to facilitate insertion and de-insertion of elements such as lithium.

Examples of such agents are organo-metallic agents, in particular organic compounds such as organo-silicon agents of the ethyl silicate type, organo-tin agents and organo-boric agents of the borate type, or inorganic compounds such as phosphoric acid, sodium tetraborate, and ammonium chloride.

It will be observed that making an anode in the form of a carbon fiber structure in accordance with the invention can be envisaged for secondary cells other than those shown in FIG. 1, and in particular for secondary cells that are cylindrical in shape. Under such circumstances, the carbon fiber substrate is not presented in the form of one or more flat layers, but in the form of a roll.

The assembly was clamped between terminals 42, 44 constituted by stainless steel plates, and sealing was provided by a peripheral gasket 46.

The anode 10 was obtained from rayon cloth in the form of multifilament viscose of textile origin in which carbon black had been incorporated.

The viscose was carbonized at a temperature of about 1000° C., being kept at that temperature for about 1 min, after being precarbonized at about 400° C. Carbon was obtained having a mean distance ($d_{002}$) equal to 0.384 nm with mean crystallite dimensions $L_c$ and $L_a$ respectively equal to 2.03 nm and to 3.57 nm, and the total porosity of the carbon fibers was equal to about 21%. A carbon cloth was thus obtained having mechanical strength and electrical conductivity characteristics enabling it to be used directly as an electrode.

Tests performed on the cell made in this way with an anode having a mass of 27.9 milligrams (mg), electromotive force (emf) of 3.101 volts (V), and a charging or discharging current of 0.5575 milliamps (mA). The test showed initial capacity relative to the mass of carbon fiber fabric equal to 316 milliampere-hours per gram (mAh/g), with said capacity charging to 212 mAh/g after five charge-discharge cycles.

Figure 2:
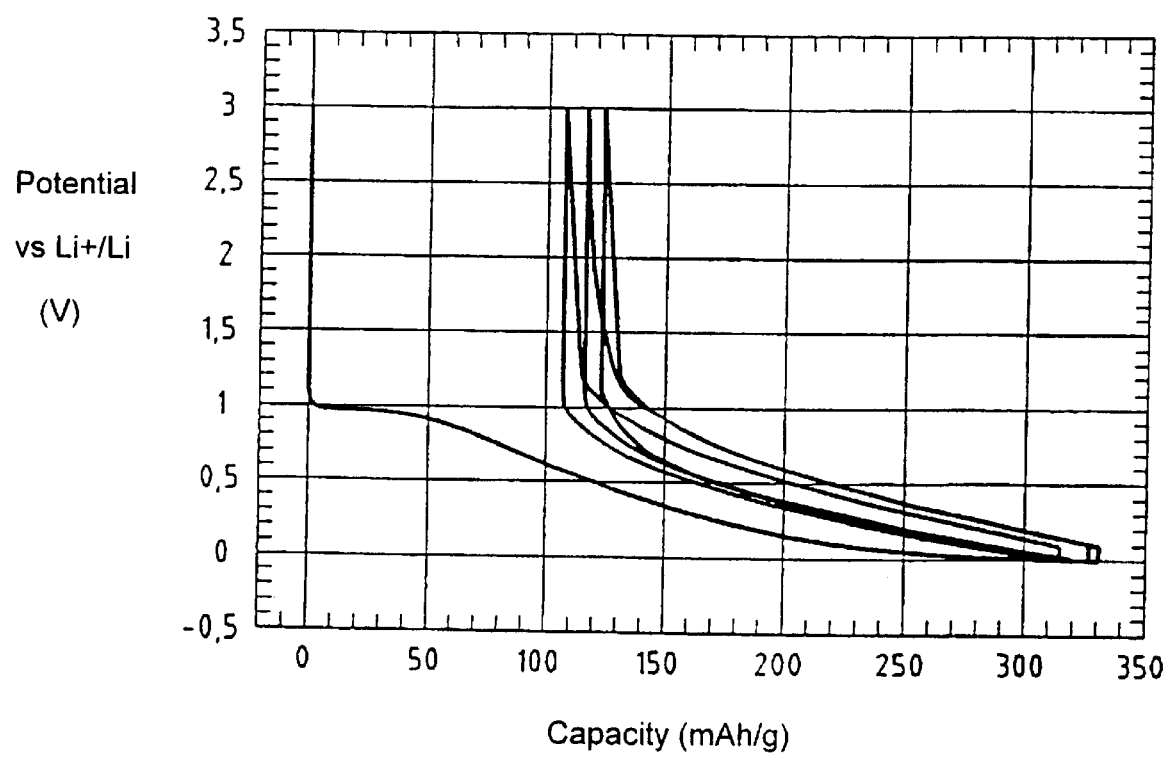
FIGS. 2 and 3 are graphs showing how potential varies during five successive charging and discharging operations, and thus giving the capacity of the cell after each stage, respectively for a first and for a second embodiment.

FIG. 2 shows the electrochemical performance of the system made by plotting variation in specific capacity as a function of potential for the system during the five charge-discharge cycles. The table below gives the capacities measured during the five successive discharge and charge cycles d1, c1, . . . , d5, c5.

|  | d1 | c1 | d2 | c2 | d3 | c3 | d4 | c4 | d5 | c5 |
|---|---|---|---|---|---|---|---|---|---|---|
| Capacity (mAh/g) | 316 | 212 | 226 | 212 | 219 | 212 | 212 | 212 | 212 | 212 |

EXAMPLES

Examples of the invention are described below in the context of its application to a lithium secondary cell as shown in FIG. 1.

Example 1

A secondary cell was made having a cathode 20 made of $LiCoO_2$ powder bonded together with carbon black in a binder such as polyoxyethylene (POE) or polyvinylidene fluoride (PVDF). The cathode in the form of a disk having a diameter of 10 millimeters (mm) had a thickness of about 0.7 mm and was in contact with a nickel collector disk 22.

The electrolyte 30 was a solution of $LiPF_6$ in a solvent constituted by a mixture of ethylene carbonate and of diethyl carbonate. The volume of electrolyte was about 1 milliliter (ml).

The separator sheet 32 was a sheet of polypropylene having a thickness of less than 0.5 mm, while the separator sheets 34 and 36 were sheets of polypropylene having a thickness that was likewise less than 0.5 mm.

The anode 10 was constituted by a layer of woven carbon fiber cloth in the form of a disk having a diameter of about 8 mm and a thickness of about 0.6 mm. It was in contact with a collector disk 12 made of nickel.

The above table and also FIG. 2 shows clearly that apart from the first discharge, a reproducible and stable process was obtained with relatively small hysteresis, the difference between charging and discharging being very small after the first discharge.

Example 2

The procedure was the same as in Example 1 but the rayon cloth had added thereto, prior to carbonization, an organo-tin agent at a concentration of about 10% by mass relative to the mass of dry cloth.

A test was performed with an anode weighing 14.5 mg, the emf being 3.103 V and the current being 0.29 mA.

The measured initial capacity exceeded 488 mAh/g, whereas the capacity after 5 discharge-charge cycles was 326 mAh/g.

Figure 3:
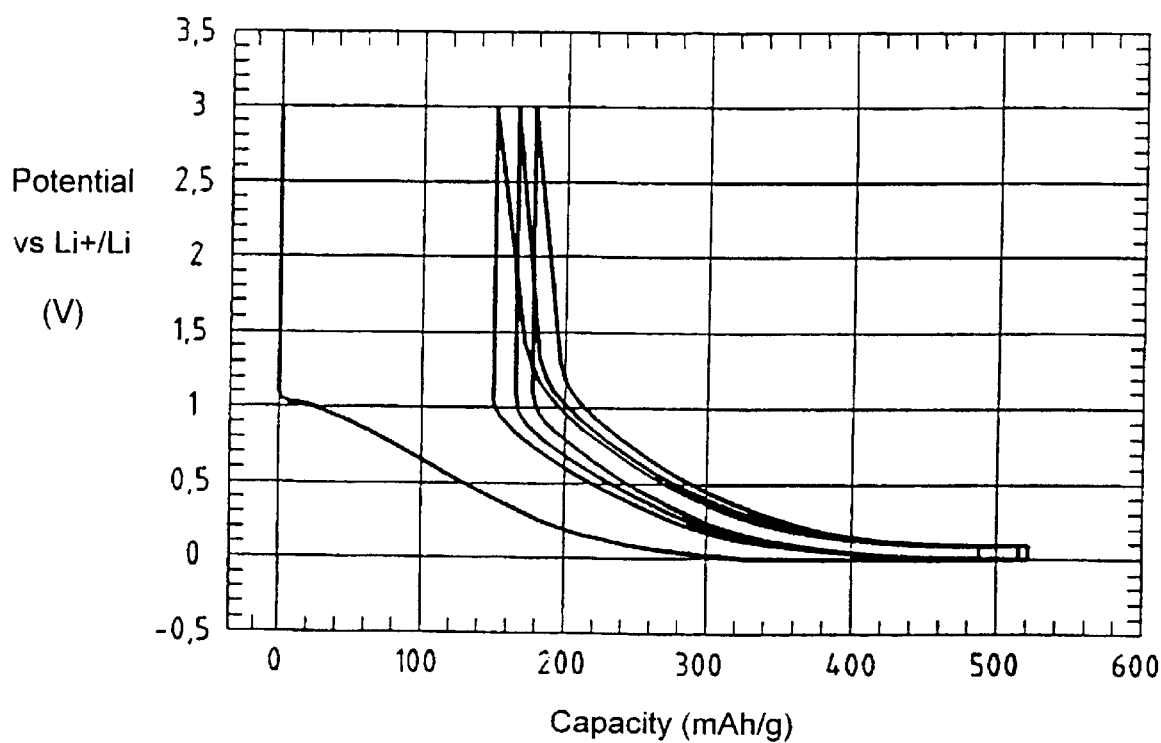

FIG. 3 shows the electrochemical performance of the resulting system, in the same manner as FIG. 2. The table below gives the capacities measured during the first five discharge-charge cycles d'1, c'1, . . . , d'5, c'5.

|  | d'1 | c'1 | d'2 | c'2 | d'3 | c'3 | d'4 | c'4 | d'5 |
| --- | --- | --- | --- | --- | --- | --- | --- | --- | --- |
| Capacity (mAh/g) | 488 | 339 | 339 | 326 | 325 | 326 | 339 | 339 | 326 |

FIG. 3 and the above table thus confirm that a reproducible and stable process is obtained in spite of the increase in capacity compared with Example 1.

The above examples show the excellent adaptation of the carbon fiber structure to easy insertion and de-insertion of lithium ions, and the significant contribution of introducing additive agents into the carbon fiber fabric, which introduction is easy and compatible, particularly when using a rayon precursor.

What is claimed is:

1. A secondary cell electrode comprising a carbon fiber substrate, the electrode being characterized in that the carbon of the fibers has a mean lattice surface spacing ($d_{002}$) of not less than 0.36 nm and a crystallite size such that the mean height ($L_c$) lies in the range 0.7 nm to 3 nm and the mean width ($L_a$) lies in the range 2 nm to 6 nm, and presents total porosity lying in the range 10% to 30%.

2. An electrode according to claim 1, characterized in that the mean lattice surface spacing ($d_{002}$) is not less than 0.38 nm.

3. An electrode according to claim 2, characterized in that:
   the size of the crystallite is such that the mean height ($L_c$) is equal to about 1 nm and the mean width ($L_a$) is equal to about 3 nm;
   the total porosity of the carbon fibers is equal to about 20%;
   the carbon fibers are derived from a carbon or viscose carbon precursor containing carbon black;
   the carbon fiber structure is constituted by a two-dimensional fabric made by weaving; and
   it is constituted by a carbon fiber fabric that is not bonded to an electrically conductive support.

4. A secondary cell comprising: an anode comprising a carbon fiber substrate; a cathode comprising a lithium compound enabling lithium ions to be inserted and de-inserted; and an electrolyte, the cell being characterized in that the anode is constituted by an electrode according to claim 3.

5. An electrode according to claim 1 characterized in that the size of the crystallite is such that the mean height ($L_c$) is equal to about 1 nm and the mean width ($L_a$) is equal to about 3 nm.

6. An electrode according to claim 1 characterized in that the total porosity of the carbon fibers is equal to about 20%.

7. An electrode accordion to claim 1 characterized in that the carbon fibers are derived from a carbon precursor selected from cellulose precursors, phenolic precursors, and isotropic pitch precursors.

8. An electrode according to claim 7, characterized in that the precursor is rayon or viscose.

9. An electrode according to claim 8, characterized in that the precursor also contains carbon black.

10. An electrode according to claim 1 characterized in that the carbon fiber structure is constituted by a two-dimensional fabric.

11. An electrode according to claim 10, characterized in that the carbon fiber fabric is made by weaving.

12. An electrode according to claim 10 characterized in that it is constituted by a carbon fiber fabric that is not bonded to an electrically conductive support.

13. A secondary cell comprising: an anode comprising a carbon fiber substrate; a cathode comprising a lithium compound enabling lithium ions to be inserted and de-inserted; and an electrolyte, the cell being characterized in that the anode is constituted by an electrode according to claim 1.

14. A method of manufacturing an electrode for a secondary cell, the method comprising preparing a carbon fiber substrate and being characterized in that it includes the steps consisting in:
   preparing a two-dimensional fabric of carbon-precursor fibers selected from cellulose precursors, phenolic precursors, and isotropic pitch precursors; and
   performing heat treatment to transform the precursor into carbon, in which the lattice surface spacing ($d_{002}$) is not less than 0.36 nm, and the crystallite size is such that the mean height ($L_c$) lies in the range 0.7 nm to 3 nm and the mean width ($L_a$) lies in the range 2 nm to 6 nm, and the total porosity of the carbon fibers lies in the range 10% to 30%.

15. A method according to claim 14, characterized in that the heat treatment for transforming the precursor into carbon is performed so that the lattice surface spacing ($d_{002}$) is not less than 0.38 nm.

16. A method according to claim 15, characterized in that:
   heat treatment for transforming the precursor into carbon is performed in which the crystallite size is such that the mean height ($L_c$) is equal to about 1 nm and the mean width ($L_a$) is equal to about 3 nm;
   heat treatment is performed to transform the fiber precursor into carbon in which the total porosity is equal to about 20%;
   a two-dimensional rayon fiber fabric is prepared and heat treatment is performed at a temperature lying in the range 900° C. to 1000° C.;
   a rayon fiber fabric is used in which carbon black is incorporated;
   the heat treatment is performed at said temperature lying in the range 900° C. to 1000° C. for a duration lying in the range 0.1 min to 1.5 min;
   an additive selected from organo-silicon compounds, organo-tin compounds, and organo-boron compoungs is incorporated in the two-dimensional fabric prior to the heat treatment for transforming the precursor; and
   an additive is incorporated in the two-dimensional fabric prior to the heat treatment for transforming the precursor, said additive being in the form of an inorganic agent selected from phosphoric acid, sodium tetraborate, and ammonium chloride.

17. A method according to claim 14, characterized in that heat treatment for transforming the precursor into carbon is performed in which the crystallite size is such that the mean height ($L_c$) is equal to about 1 nm and the mean width ($L_a$) is equal to about 3 nm.

18. A method according to claim 14 characterized in that heat treatment is performed to transform the fiber precursor into carbon in which the total porosity is equal to about 20%.

19. A method according to claim 14 characterized in that the heat treatment is performed at a temperature lying in the range 700° C. to 1300° C.

20. A method according to claim 14 characterized in that a two-dimensional rayon fiber fabric is prepared and heat treatment is performed at a temperature lying in the range 900° C. to 1000° C.

21. A method according to claim 20, characterized in that a rayon fiber fabric is used in which carbon black is incorporated.

22. A method according to claim 20 characterized in that the heat treatment is performed at said temperature lying in the range 900° C. to 1000° C. for a duration lying in the range 0.1 min to 1.5 min.

23. A method according to claim 14 characterized in that an additive selected from organo-metallic compounds is incorporated in the two-dimensional fabric prior to the heat treatment for transforming the precursor.

24. A method according to claim 23 characterized in that the additive is selected,from organo-silicon compounds, organo-tin compounds, and organo-boron compounds.

25. A method according to claim 14 characterized in that an additive is incorporated in the two-dimensional fabric prior to the heat treatment for transforming the precursor, said additive being in the form of an inorganic agent selected from phosphoric acid, sodium tetraborate, and ammonium chloride.

* * * * *